United States Patent [19]

Münchow et al.

[11] 4,188,509
[45] Feb. 12, 1980

[54] TONE SIGNALLING ARRANGEMENT FOR A TELECOMMUNICATIONS EXCHANGE

[75] Inventors: Peter Münchow, Stuttgart; Walter Kaiser, Leinfelden, both of Fed. Rep. of Germany

[73] Assignee: International Standard Electric Corporation, New York, N.Y.

[21] Appl. No.: 937,287

[22] Filed: Aug. 28, 1978

[30]  Foreign Application Priority Data

Sep. 6, 1977 [DE] Fed. Rep. of Germany ....... 2740104

[51] Int. Cl.² .............................................. H04M 3/58
[52] U.S. Cl. ................................................. 179/18 AD
[58] Field of Search ........ 179/18 BD, 84 VF, 18 GE, 179/18 GF, 18 FA, 18 J, 99, 18 AD

[56]  References Cited

U.S. PATENT DOCUMENTS 4,075,430  2/1978  Reines ................................. 179/18 J

*Primary Examiner*—Thomas A. Robinson
*Attorney, Agent, or Firm*—James B. Raden; Marvin M. Chaban

[57]  ABSTRACT

A telecommunications exchange having a multiple stage switching network. Calls initiated within the exchange may be local calls to be completed internally, may be trunk calls to a central office or may be enquiry calls completed locally. For calls of the last type, a tone stage in parallel with the first switching stage of the network is used. Resistors each having one half the resistance of the subscriber line input resistance are connected to each inlet wire from the subscriber to the tone stage. The tone stage is used in local calls for providing tone signals and also used for enquiry calls. For providing d.c. bias to the speech wires, a pad stage is provided in parallel with the second switching stage. Resistances in the leads to this stage provide attenuation.

7 Claims, 2 Drawing Figures

TONE SIGNALLING ARRANGEMENT FOR A TELECOMMUNICATIONS EXCHANGE

BACKGROUND OF THE INVENTION

The present invention relates to a circuit arrangement for a telecommunication exchange which may be a private branch exchange system. The local exchange typically has a centrally controlled switching network via which exchange, internal and enquiry calls can be set up, and in which signals, d.c. biases and the like can be applied to the switching network, and in which the exchange trunks are connected via amplifiers to the inlets of a first connecting stage of the switching network.

If, in a telephone private branch exchange system, a subscriber making an exchange call makes an enquiry call to another subscriber of the private branch exchange system, the switching network must be terminated toward the exchange trunk during the enquiry call. To do this, the amplifier connecting the exchange trunk to the occupied input of the private branch exchange must be inactivated and the exchange trunk must be terminated in a resistance whose value is specified by the company or authority operating the communications network. It is known to effect this termination with special switching devices provided on the public-exchange side of the amplifier, such special switching devices being necessary for each exchange trunk.

SUMMARY OF THE INVENTION

The object of the invention is to reduce the amount of circuitry required to terminate the switching network during such enquiry calls.

According to the invention, a tone stage in parallel with the first connecting stage of the switching network is connected to the inlets of the first connecting stage via terminating resistors.

The principal advantage of the invention is that it permits a simple application of a d.c. bias which is necessary to set the most efficient operating point if the switching network is realized using semiconductor switching devices. Semiconductor devices, particularly in the form of integrated circuits, are being increasingly used in computer-controlled telecommunication systems. On the other hand, the invention also makes it possible to introduce a loss into the speech path during internal calls in a simple manner in order to obtain the same loss during exchange and internal calls. The connection of the terminating resistors and of the damping resistors is balanced. It is also possible to impose warning tones on an existing connection.

BRIEF DESCRIPTION OF THE DRAWINGS

An embodiment of the invention will now be explained with reference to the accompanying drawings, in which.

DETAILED DESCRIPTION OF THE DRAWINGS

Figure 1:
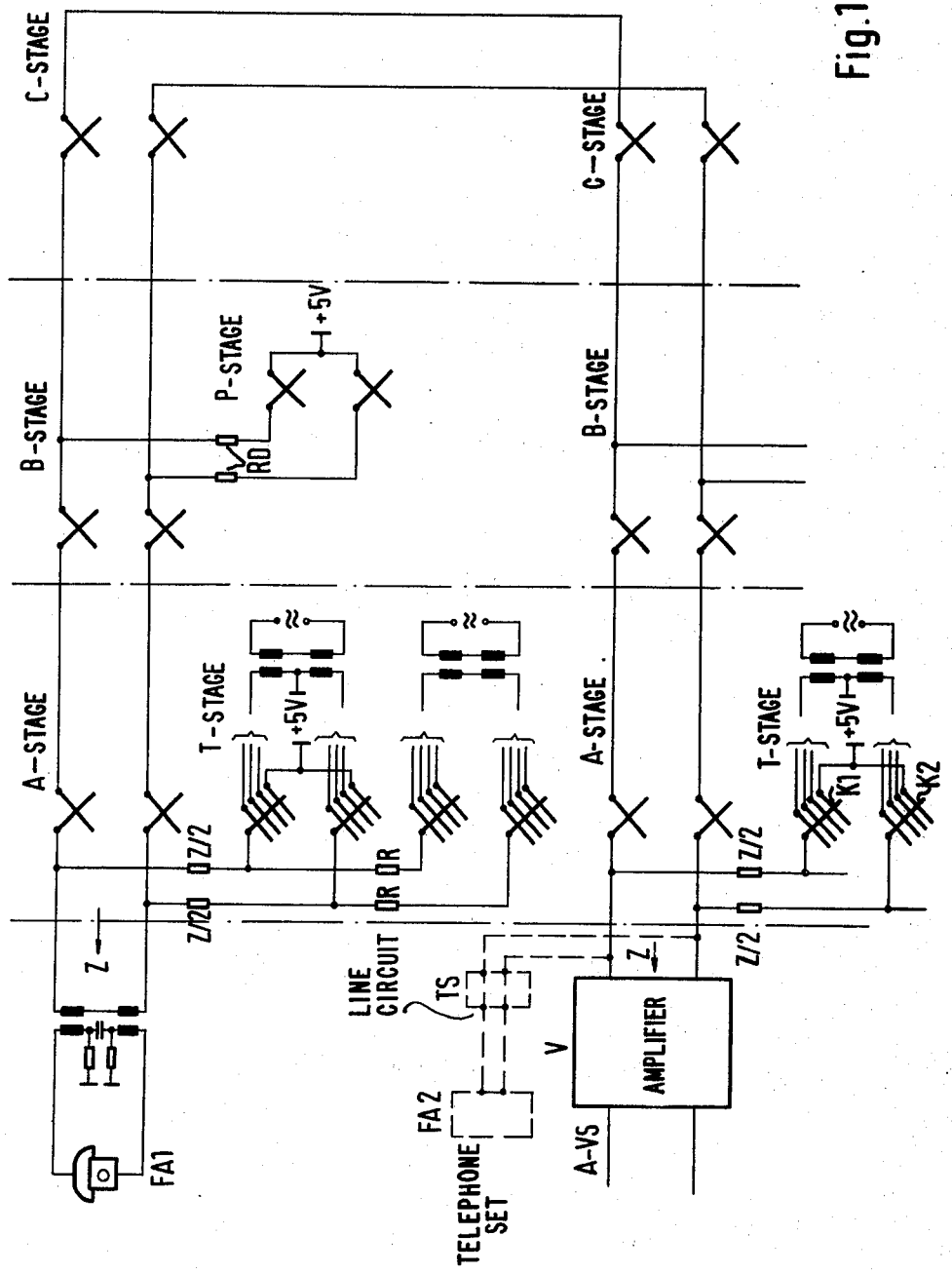
FIG. 1 shows a circuit arrangement according to the invention in the form of a telephone private branch exchange.

A switching network of a telephone private branch exchange system as shown in FIG. 1 includes three connecting stages in series: A-stage, B-stage, and C-stage. Coupled to the inlets of the first connecting stage A are subscriber line circuits TS which connect via associated subscriber lines to telephone sets FA1, FA2. It makes no difference whether the individual subscribers seize the exchange in the outgoing or incoming direction. Part of the inlets of the first connecting stage A are connected via an amplifier V to a trunk junctor A-VS to which an exchange trunk AL running to a local exchange is connected.

The switching network of the private branch exchange of FIG. 1 is controlled by a processor (not shown). After the calling telephone set FA1 has transmitted the dial information, the processor closes the crosspoints necessary to set up the call. This is preferably done via field-effect transistors whose channels are inserted in the path to be switched through. In one embodiment, the field-effect transistors are driven with $+24$ V in the "on" state, and with ground potential in the "off" state.

An internal connection is established via all three connecting stages A, B and C in the ascending direction, and then back via the C-, B- and A-stages in the descending direction. Thus, an internal connection between, e.g., the calling telephone set FA1 and the called telephone set FA2 is established via six switches in each of which both wires of the connection are extended via a crosspoint. In FIG. 1, the called telephone set FA2, which is also connected to one inlet of the first connecting stage A, and its subscriber line circuit TS are indicated by broken lines.

Connected in parallel with the first connecting stage A of the above-explained switching network is a tone stage referred to as "T-stage". The T-stage is connected to each wire of the two-wire inlets of the A-stage via terminating resistors $Z/2$ of equal value. The value of each of these two terminating resistors $Z/2$ is equal to half the value of the specified subscriber line input resistance Z (e.g. 600 ohms) as viewed from the exchange trunk.

The audio-frequency signals generated in a tone generator shown schematically in the figure are applied through the tone stage T to the speech wires if required, i.e., as soon as signal tones are necessary. The audio-frequency ac voltage is supplemented with a d.c. bias (e.g. $+5$ V) which, during signalling, sets the required operating points of the transistors of the switching network.

According to the invention, the tone stage, which is necessary to switch the audio-frequency signals, is also used to terminate the speech path to the exchange trunk during an enquiry call. To do so, it is only necessary to close two crosspoints K1, K2 of the tone stage, whereupon the two wires of the busy inlet line of the first connecting stage A are interconnected via the total terminating resistance Z. During the enquiry call, the amplifier V is inactive. To terminate the exchange speech path, therefore, no additional devices are necessary. During an exchange call via the junctor A-VS, the d.c. component necessary to set the operating point is supplied by the amplifier V in addition to the speech signals. During an enquiry call, however, the amplifier V cannot provide the d.c. bias.

Connected in parallel with one of the stages of the switching network—in the embodiment with the B-stage—is a pad stage which is designated in FIG. 1 by "P-stage", and via which the d.c. bias is fed into the speech wires during an enquiry call and during other internal calls. The P-stage is connected to the two wires of the outlet line of the B-stage via two damping resistors RD. The resistance 2·RD between the two wires attenuates the speech path during internal calls. This attenuation is desirable for transmission reasons in order to obtain the same loss during exchange and internal calls. Thus, the P-stage, too, has a dual function. It superimposes an a.c. bias on the d.c. speech current, and in addition, attenuates the speech path during internal calls.

Besides via the terminating resistors Z/2, the tone stage T is connected to the two-wire inlets of the A-stage of the switching network via high-value resistors R. Via these additional resistors R, if a suitable path is switched through the tone stage, warning signals, generated in a tone generator, can be imposed on existing connections (e.g. to signal a waiting call), both during internal and exchange calls. The warning signals must be fed in through a high-value resistor to avoid any undue attenuation of the speech signals.

Figure 2:
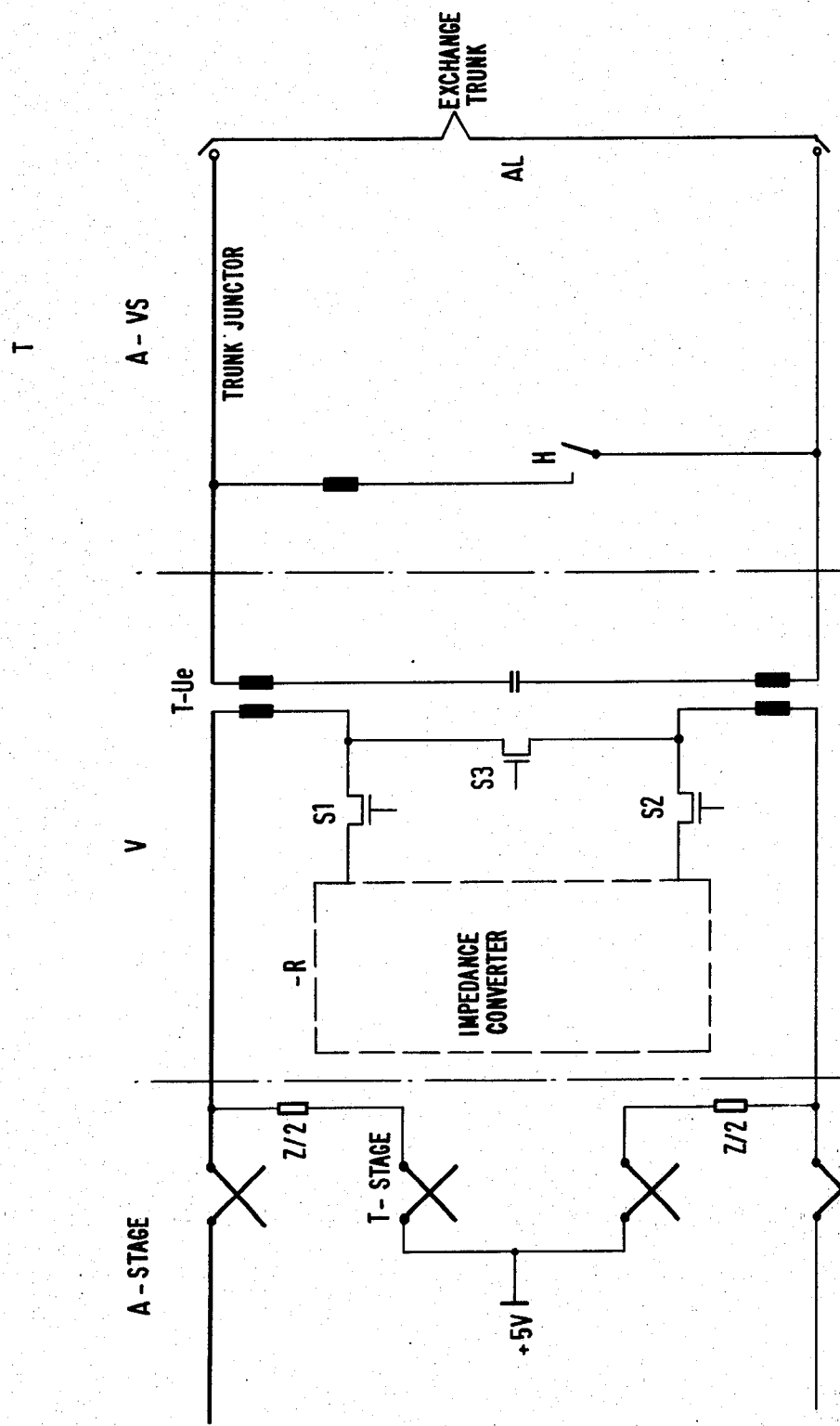
FIG. 2 shows a part of the circuit arrangement of FIG. 1 which illustrates the transition from an inlet of the first connecting stage via an amplifier to a trunk junctor, and thus, to an exchange trunk.

FIG. 2 illustrates the transition from an inlet of the first connecting stage A of the private branch exchange to the associated trunk junctor A-VS. The amplifier V, which isolates the exchange trunk from the switching network, provides the d.c. bias during exchange calls and equalizes the attenuation caused by the switching transistors in the speech path. It is preferably designed as a so-called negative resistance (impedance converter), as indicated by the resistance value —R. It is controlled via three switches S1, S2 and S3.

When the switch S3 is on, the amplifier V is inactive. When the switches S1 and S2 are on, the amplifier V is inserted as a negative resistance —R in the connection to the public exchange. An isolation transformer T-Ue designed as a high-pass filter isolates the amplifier V from the trunk junctor A-VS. Connected to the trunk junctor A-VS, which contains essentially a locking relay (H) for closing the loop contact, is the exchange trunk AL.

Both the tone stage (T-stage) and the pad stage (P-stage) must have access to all subscriber line circuits TS and to all trunk junctors A-VS. Therefore, the terminating resistors Z/2 are looped into all connections to the inlets of the first connecting stage A, and the damping resistors RD into all connections to the outlets of the second connecting stage B.

In the circuit arrangement according to the invention, no special switching means are necessary to connect the terminating and damping resistors. These connections are made by the tone stage and by the pad stage, and are controlled by the central processor.

What is claimed is:

1. A multiple stage, processor controlled crosspoint switching network having an inlet side for coupling to stations and an outlet side for folding connection through the network to complete a path therethrough, an auxiliary crosspoint stage for tone transmission coupled in parallel with a first stage of the network and coupled to the inlet side of the network, a source of tones coupled to said auxiliary stage to pass tone signals through crosspoints of the auxiliary stage to a station coupled to the inlet side of said network, and in which there are terminating resistors of said auxiliary stage coupled to said inlet side of the network.

2. A network as claimed as claim 1, each stage of the network comprising two-wire balance switching and in which the coupling of the inlet side of the first stage of the network are two-wire inlets and in which each inlet wire is coupled to the auxiliary stage through one of said terminating resistors, and in which the resistance of each terminating resistor is approximately one-half the value of the input resistance of a line to a station of the network.

3. A network as claimed in claim 1, further including resistors having high value of resistance inserted between inlets of the inlet stage and the auxiliary stage.

4. A network as claimed in claim 1, in which the crosspoints of the switching network and the auxiliary stage are field effect transistors.

5. A network as claimed in claim 4, in which there are at least three stages in series in said network, and in which there is a further auxiliary switching stage in parallel with an intermediate stage of said network for applying fixed d.c. bias for a call completed between stations of said network through the crosspoints of the network.

6. A network as claimed in claim 5, in which outlets of the intermediate stage are coupled to the further auxiliary stage through damping resistors.

7. A network as claimed in claim 6, in which each wire of the two wires on the outlet side of the intermediate switching stage is coupled to the further stage through one of said damping resistors.

* * * * *